United States Patent
Siappas

(10) Patent No.: US 7,134,268 B2
(45) Date of Patent: Nov. 14, 2006

(54) SHACKLE AND METHOD FOR RELEASING OR INSTALLING A SHACKLE SUBSEA WITH AN ROV

(75) Inventor: George Siappas, Houston, TX (US)

(73) Assignee: Oceaneering International, Inc., Houston, TX (US)

(*) Notice: Subject to any disclaimer, the term of this patent is extended or adjusted under 35 U.S.C. 154(b) by 0 days.

(21) Appl. No.: 11/280,498

(22) Filed: Nov. 16, 2005

(65) Prior Publication Data

US 2006/0101799 A1    May 18, 2006

Related U.S. Application Data

(60) Provisional application No. 60/628,483, filed on Nov. 16, 2004.

(51) Int. Cl.
*F16G 15/04* (2006.01)
*E05B 39/02* (2006.01)

(52) U.S. Cl. ................................. 59/86; 59/85
(58) Field of Classification Search ............. 59/85, 59/86
See application file for complete search history.

(56) References Cited

U.S. PATENT DOCUMENTS 3,462,945 A * 8/1969 Barber .................... 59/86
5,046,881 A * 9/1991 Swager .................... 59/86
5,460,418 A * 10/1995 Falls ....................... 59/86
6,023,927 A * 2/2000 Epstein ................... 59/86

OTHER PUBLICATIONS

"Hydraulic Release Shackle 400 t Standard", IHC Handling System VOF @ http://ihc.negeso.com.*
Catalog Pages from The Crosby Group, Inc.; Shackles; 2002; 57-68.
Catalog Pages from IHC Handling Systems VOF; Hydraulic Release Shackle; undated, 4 pages.
Webpage from IHC Handling Systems VOF; Hydraulic Release Shackles, http://ihc.negeso.com/hydraulic_release_shackles.html; one page.

* cited by examiner

*Primary Examiner*—David Jones
(74) *Attorney, Agent, or Firm*—Duane Morris LLP

(57) ABSTRACT

The present inventions relate generally to a shackle assembly and a method for installing and/or releasing the shackle assembly subsea. The shackle assembly of the present invention comprises first and second plates mounted on either side of a shackle body eyelet and a shackle pin mounting assembly for use in mounting a shackle pin using a shackle pin pulling tool.

21 Claims, 3 Drawing Sheets

_US 7,134,268 B2_

SHACKLE AND METHOD FOR RELEASING OR INSTALLING A SHACKLE SUBSEA WITH AN ROV

PRIORITY INFORMATION

This application claims the benefit of U.S. Provisional Application No. 60/628,483, filed on Nov. 16, 2004.

FIELD OF INVENTION

The present inventions relate generally to a shackle assembly and a method for installing and/or releasing the shackle assembly subsea. The shackle assembly of the present invention comprises first and second plates mounted on either side of a shackle body eyelet and a shackle pin mounting assembly for use in mounting a shackle pin using a shackle pin pulling tool.

DETAILED DESCRIPTION OF THE PREFERRED EMBODIMENTS

The design involves modifying an industry standard shackle (Crosby) in such a way so that the shackle pin can be removed subsea with the use of a remotely operated vehicle ("ROV"). The benefit of the specific design is that the hydraulic mechanism used by the ROV to remove the shackle is installed and retrieved subsea separate from the shackle body by the ROV. The present invention allows multiple subsea shackles to be operated with the use of a single hydraulic shackle pin removal or installation tool.

This renders the device less prone to damage of critical parts of the pin removal mechanism during the subsea lifting/installation process. In addition to the above it provides with the option/capability to retrieve the shackle pin removal or installation mechanism to the surface for repair in case of a subsea failure. A single shackle pin removal or installation mechanism may be used on multiple shackles.

The above is important on critical offshore lifting operations especially when removing large shackles that have been heavily loaded during the lift as the pins can be difficult to remove by use of the ROV alone or a standard industry spring assist.

The design is based on using the standard shackle body and fabricating a modified shackle pin incorporating a grooved end which will be used to pull the pin out of the shackle body in order to disengage the shackle from the subsea structure padeye.

In one preferred embodiment, the design also incorporates a flanged connection around one of the two "lobes" of the shackle body that is used to provide for a steel structure to react the linear pull load required to pull the pin out of the shackle. This structure also acts as a "guide" aiding in installation of the hydraulic "pin pulling" mechanism by the ROV. An advantage of the present invention is that prior art shackles may be modified as explained herein without altering the original load certification.

In one preferred embodiment, the design is completed by a locking plate that is designed in such a way so as to secure the modified pin into the shackle, this is done in order to ensure that the shackle stays securely attached to the subsea structure padeye. This attachment offers a degree of integrity similar to that produced by a traditional cotter pin arrangement.

In one preferred embodiment, the locking plate is designed in such a way so that it is ROV removable. The plate will require removal by the ROV prior to engaging the hydraulic "pin pulling" mechanism.

Figure 1:
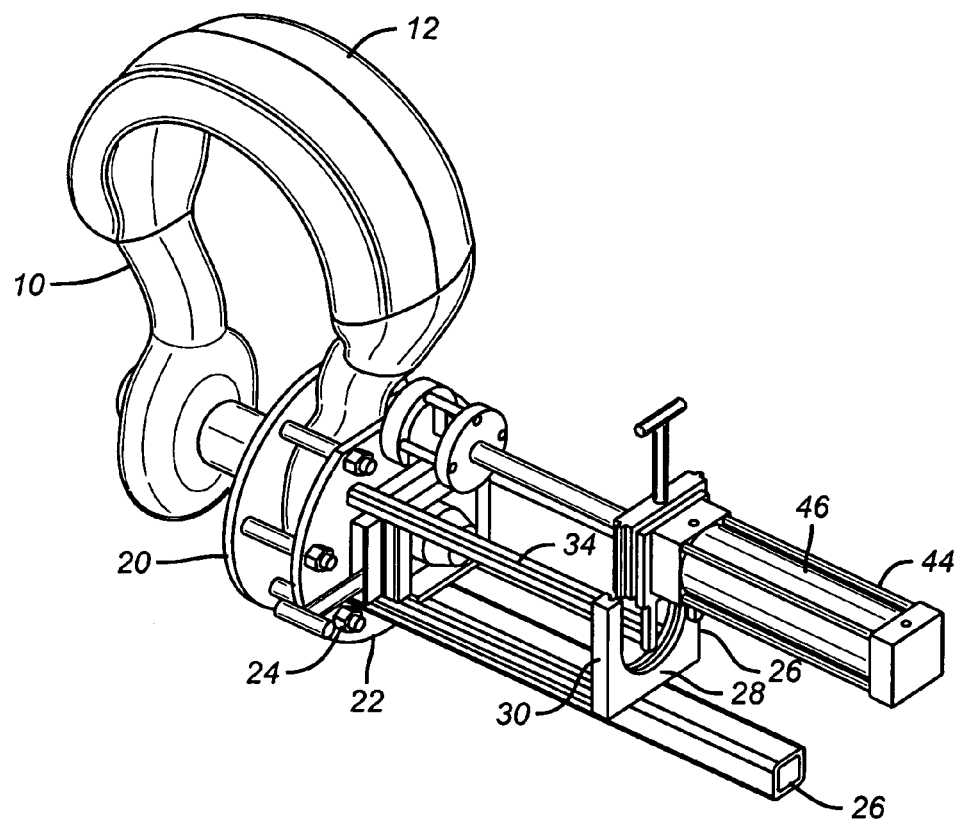
FIG. 1 is an isometric view of the present invention.
Figure 3:
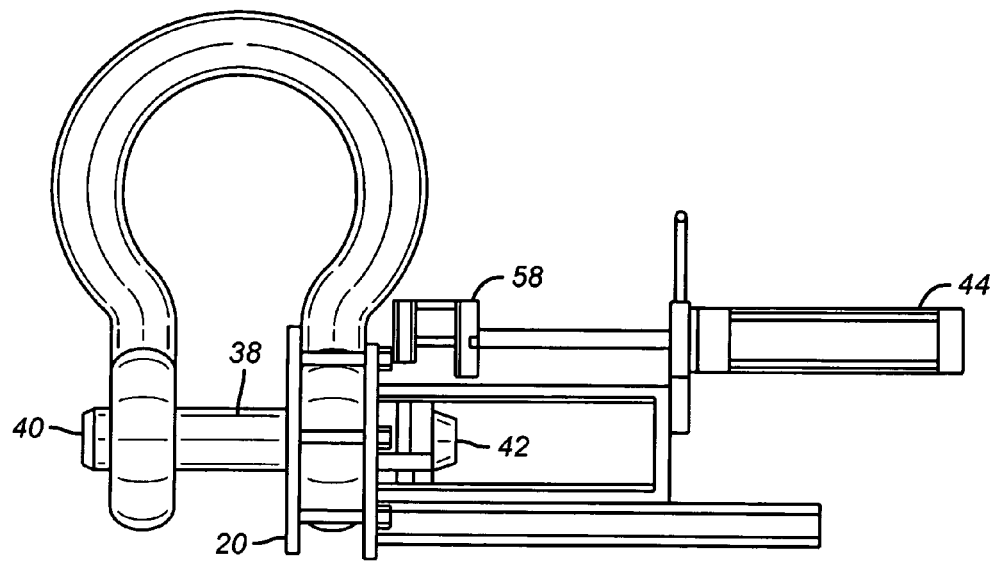
FIG. 3 is a side view of the present invention wherein a pin pulling tool has engaged a shackle pin.
Figure 4:
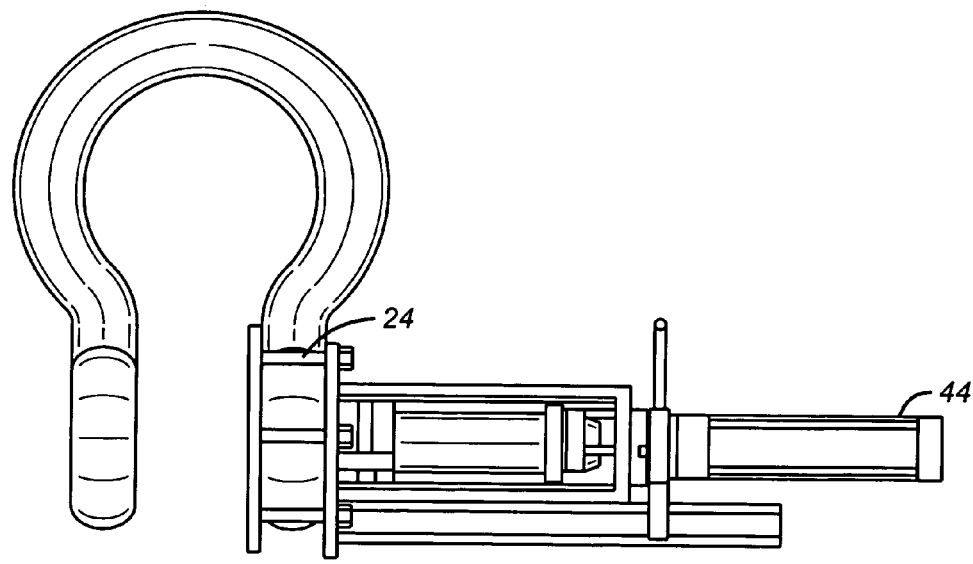
FIG. 4 is a side view of the present invention wherein the pin pulling tool is not engaged with a shackle pin.
Figure 5:
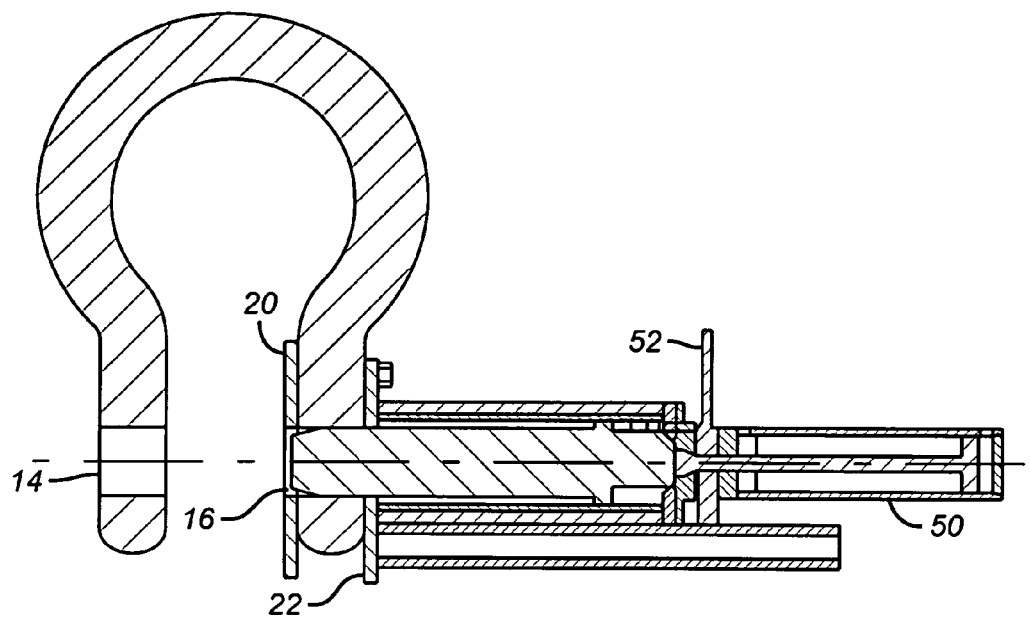
FIG. 5 is a cross sectional side view of the perspective shown in FIG. 3.

A preferred embodiment of the shackle pin assembly of the present invention is shown in FIGS. 1–6 and described below. In a preferred embodiment, the shackle assembly of the present invention comprises a U shaped body 10 comprising a central curved region 12 as shown in FIG. 1. The U shaped body further comprises a first eyelet 14 at a first end and a second eyelet 16 at a second end opposite the first end. The first and second eyelets are aligned as shown in FIG. 5. The first end comprises an inner surface and an outer surface.

In a preferred embodiment, the shackle assembly of the present invention further comprises a first plate 20 comprising a centrally located first port and mounted on the inner surface of the second end of the U shaped body, as shown in FIG. 1. In a preferred embodiment, the first plate is positioned such that its port is aligned with the second eyelet, as shown in FIG. 5.

In a preferred embodiment, the shackle assembly of the present invention further comprises a second plate 22 comprising a centrally located second port. The second plate is mounted on the outer surface of the second end of the U shaped body such that its port is aligned with the second eyelet, as shown in FIG. 5. In a preferred embodiment, the first and second plates are round, as shown in FIG. 1. In a preferred embodiment, at least two connectors 24 connect the first plate and the second plate, as shown in FIG. 1. In another preferred embodiment, the invention further comprises a third connector 24 connecting the first and second plates. In another preferred embodiment, each connector comprises a nut and a bolt, as shown in FIG. 4.

Figure 6:
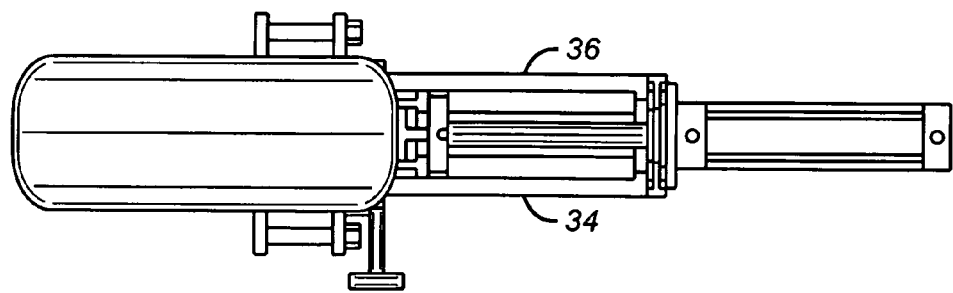
FIG. 6 is a top view of the pin pulling tool of the present invention.

In a preferred embodiment, the shackle assembly of the present invention further comprises a lower support beam 26 extending outward from the lower region of the second plate as shown in FIG. 1. In a preferred embodiment, the shackle assembly of the present invention further comprises an alignment plate 28 mounted on the lower support beam and comprising a left arm 30, a right arm 32, and a central groove between the left and right arms, as shown in FIG. 1. A left upper support beam 34 extends between the second disk and the left arm. A right upper support beam 36 extends between the second disc and the right arm, as shown in FIGS. 1 and 6.

In a preferred embodiment, the shackle assembly of the present invention further comprises a shackle pin 38 comprising a first end region 40 extending through the first eyelet. In a preferred embodiment, the shackle pin further comprises a second end region 42 extending through the first port, the second eyelet, and the second port, as shown in FIG. 3. The second end region comprises at least one groove sized to receive a pin pulling tool.

Figure 2:
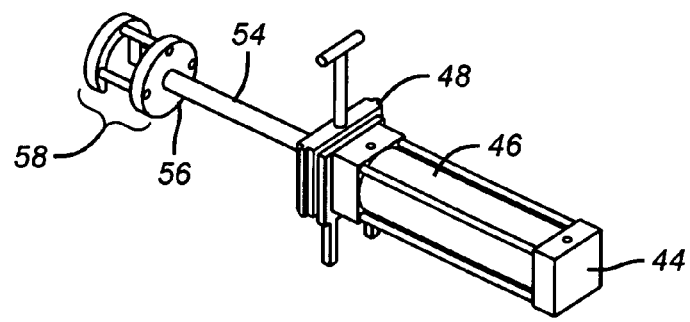
FIG. 2 is an isometric view of the pin pulling tool of the present invention.

In a preferred embodiment, the invention further comprises a pin pulling tool 44, as shown in FIGS. 1–4. In a preferred embodiment, the pin pulling tool comprises a piston housing 46 which comprises a front end 48 and a housing channel 50, as shown in FIGS. 1, 2, and 5. In a preferred embodiment, the pin pulling tool further comprises a front plate 52 attached to the front end of the piston housing and to the alignment plate of the shackle assembly, as shown in FIGS. 1, 2, and 5.

In a preferred embodiment, the shackle pin pulling tool further comprises a shackle pin gripper 58 mounted on the front segment and adapted to engage the shackle pin groove, as shown in FIGS. 2–3. In another preferred embodiment, the gripper is coupled to the shackle pin groove.

The present invention is also directed to a method for removing a shackle pin from a shackle pin assembly. In a preferred embodiment, this method comprises coupling a piston operated shackle pin pulling tool to (i) a shackle pin installed in a U shaped body comprising a central curved region, a first eyelet it a first end, and a second eyelet at a second end opposite the first end, where the eyelets are aligned, and (ii) a shackle pin mounting assembly attached to a plate comprising a port aligned with the first eyelet, where the plate is mounted on the first end, as shown in FIGS. 1, 3 and 6.

In a preferred embodiment, this method further comprises actuating the piston to retract and to remove the pin from its engagement with the eyelets of the U shaped body, as shown in FIGS. 4 and 5. In a preferred embodiment, the actuation is responsive to pressurization. In another preferred embodiment, the pressurization is accomplished with hydraulic fluid, which may be supplied from an ROV.

In another preferred embodiment, the invention further comprises disengaging the pin pulling tool and pin from the shackle pin mounting assembly. In a preferred embodiment, this disengagement may be performed with an ROV.

The present invention is also directed to a method for installing a shackled pin in a shackled pin assembly. In a preferred embodiment, this method comprises coupling a piston operated shackle pin pulling tool to a shackle pin, as shown in FIG. 6. This embodiment further comprises coupling the piston operated shackle pin pulling tool to a shackle pin mounting assembly attached to a plate comprising a port aligned with a first eyelet in a shackle comprising a U shaped body comprising a central curved region, a first eyelet at a first end, and a second eyelet at a second end opposite the first end, where the eyelets are aligned, and where the first end comprises an inner surface and an outer surface, as shown in FIGS. 4–5.

In a preferred embodiment, this method further comprises actuating the piston to extend the shackle pin through the first and second eyelets, and the port, as shown in FIGS. 3 and 6. In a preferred embodiment, the actuation is responsive to pressurization. In another preferred embodiment, the pressurization is accomplished with hydraulic fluid, which may be supplied from an ROV.

In one preferred embodiment, a simplified procedure for using the design would be as follows. Secure modified shackle to the structure padeye and install the locking plate. Deploy the structure on the subsea location. Deploy ROV with hydraulic "pin pulling" mechanism. ROV removes locking plate from shackle. ROV engages hydraulic "pin pulling" mechanism. ROV hydraulically actuates the cylinder in the mechanism and removes the pin from the shackle body. Pin is retained in the shackle and can be re-engaged if needed. Subsea lift line and shackle can now be removed from the structure padeye.

The foregoing disclosure and description of the inventions are illustrative and explanatory. Various changes in the size, shape, and materials, as well as in the details of the illustrative construction and/or illustrative method may be made without departing from the spirit of the invention.

What is claimed is:

1. A shackle assembly comprising:
   (a) a U shaped body comprising a central curved region, a first eyelet at a first end, and a second eyelet at a second end opposite the first end, said eyelets being aligned, and said first end comprising an inner surface and an outer surface;
   (b) a first plate comprising a centrally located first port, said first plate mounted on said inner surface and positioned such that its port is aligned with the first eyelet;
   (c) a second plate comprising a lower region.,a centrally located second port, said second plate mounted on said outer surface and positioned such that its port is aligned with the first eyelet;
   (d) at least two connectors connecting the first plate and the second plate;
   (e) a lower support beam extending outward from the lower region of the second plate;
   (f) an alignment plate mounted on the lower support beam and comprising a left arms, a right arm, and a central groove between the left and right arms;
   (g) a left upper support beam extending between the second disk and the left arm;
   (h) a right upper support beam extending between the second disk and the right arm; and
   (i) a shackle pin comprising a first end region extending through the first eyelet and the first port, and further comprising a second end region extending through the second eyelet and the second port, said second end region comprising at least one groove sized to receive a pin pulling tool.

2. The shackle assembly of claim 1, further comprising a third connector connecting the first and second plates.

3. The shackle assembly of claim 1, wherein each connector comprises a nut and bolt.

4. The shackle assembly of claim 1, wherein the first and second plates are round.

5. The shackle assembly of claim 1, further comprising a pin pulling tool comprising:
   (a) a piston housing comprising a front end and a housing channel;
   (b) a front plate attached to the front end of the piston housing and to the alignment plate;
   (c) a piston extending outward from the piston housing and comprising a front segment; and
   (d) a shackle pin gripper mounted on front segment and adapted to engage the shackle pin groove.

6. The shackle assembly of claim 5, wherein the gripper is coupled to the shackle pin groove.

7. The shackle assembly of claim 5, wherein the piston is adapted to move longitudinally in response to a pressurization of the piston housing.

8. A shackle assembly comprising:
   (a) a U shaped body comprising a central curved region, a first eyelet at a first end, and a second eyelet at a second end opposite the first end, said eyelets being aligned, and said first end comprising an inner surface and an outer surface;
   (b) a first plate comprising a centrally located first port, said first plate mounted on said inner surface and positioned such that its port is aligned with the first eyelet;

(c) a second plate comprising a centrally located second port, said second plate mounted on said outer surface and positioned such that its port is aligned with the first eyelet;
(d) at least two connectors connecting the first plate and the second plate;
(e) a shackle pin mounting assembly attached to the second plate and comprising a beam extending outward from the second plate, said beam comprising a first end attached to the second plate and a second end opposite the first end, said mounting assembly further comprising a third plate attached to the second end of the beam; and
(f) a shackle pin extending through the first eyelet, the second port, and the first port, and further extending through the second eyelet.

9. The shackle assembly of claim 8, wherein the shackle pin is cylindrical.

10. The shackle assembly of claim 8, wherein each connector comprises a nut and bolt.

11. A method for removing a shackle pin from a shackle pin assembly, comprising:
(a) coupling a piston operated shackle pin pulling tool to
  (i) a shackle pin installed in a U shaped body comprising a central curved region, a first eyelet at a first end, and a second eyelet at a second end opposite the first end, said eyelets being aligned, and (ii) a shackle pin mounting assembly attached to a plate comprising a port aligned with the first eyelet, said plate being mounted on the first end; and
(b) actuating the piston to retract and to remove the pin from its engagement with the eyelets of the U shaped body.

12. The method of claim 11, wherein the actuation is responsive to pressurization.

13. The method of claim 12, wherein the pressurization is accomplished with hydraulic fluid.

14. The method of claim 13, wherein the hydraulic pressurization is supplied from an ROV.

15. The method of claim 11, further comprising disengaging the pin pulling tool and pin from the shackle pin mounting assembly.

16. The method of claim 15, wherein the disengaging is performed with an ROV.

17. A method for installing a shackled pin in a shackled pin assembly, comprising:
(a) coupling a piston operated shackle pin pulling tool to a shackle pin;
(b) coupling the piston operated shackle pin pulling tool to a shackle pin mounting assembly attached to a plate comprising a port aligned with a first eyelet in a shackle comprising a U shaped body comprising a central curved region, a first eyelet at a first end, and a second eyelet at a second end opposite the first end, said eyelets being aligned, and said first end comprising an inner surface and an outer surface; and
(c) actuating the piston to extend the shackle pin through the first and second eyelets and the port.

18. The method of claim 17, wherein the actuation is responsive to pressurization.

19. The method of claim 18, wherein the pressurization is accomplished with hydraulic fluid.

20. The method of claim 19, wherein the hydraulic pressurization is supplied from an ROV.

21. A shackle assembly comprising:
(a) a U shaped body comprising a central curved region, a first eyelet at a first end, and a second eyelet at a second end opposite the first end, said eyelets being aligned, and said first end comprising an inner surface and an outer surface;
(b) a first plate comprising a centrally located first port, said first plate mounted on said inner surface and positioned such that its port is aligned with the first eyelet;
(c) a second plate comprising a centrally located second port, said second plate mounted on said outer surface and positioned such that its port is aligned with the first eyelet;
(d) at least two connectors connecting the first plate and the second plate; and
(e) a shackle pin extending through the second eyelet, the first port, the first eyelet and the second port.

* * * * *